(12) United States Patent
Loy et al.

(10) Patent No.: US 10,619,023 B2
(45) Date of Patent: Apr. 14, 2020

(54) GREEN CHEMISTRY METHOD OF SYNTHESIZING POLYMER STRUCTURES THAT CAN FUNCTION AS A BUILT-IN ANTIOXIDANT

(71) Applicant: ARIZONA BOARD OF REGENTS ON BEHALF OF THE UNIVERSITY OF ARIZONA, Tucson, AZ (US)

(72) Inventors: Douglas A. Loy, Tucson, AZ (US); Robb E. Bagge, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 6 days.

(21) Appl. No.: 15/751,797

(22) PCT Filed: Aug. 9, 2016

(86) PCT No.: PCT/US2016/046199
§ 371 (c)(1),
(2) Date: Feb. 9, 2018

(87) PCT Pub. No.: WO2017/027521
PCT Pub. Date: Feb. 16, 2017

(65) Prior Publication Data
US 2018/0230282 A1 Aug. 16, 2018

Related U.S. Application Data

(60) Provisional application No. 62/269,564, filed on Dec. 18, 2015, provisional application No. 62/203,828, filed on Aug. 11, 2015.

(51) Int. Cl.
*C08C 19/12* (2006.01)
*C08J 9/02* (2006.01)
(Continued)

(52) U.S. Cl.
CPC .................. *C08J 9/02* (2013.01); *C08C 19/06* (2013.01); *C08C 19/12* (2013.01); *C08C 19/22* (2013.01);
(Continued)

(58) Field of Classification Search
CPC .... C08F 8/30; C08F 8/32; C08F 36/04; C08F 36/045; C08F 36/06; C08F 36/014; C08F 36/18; C08C 19/22
See application file for complete search history.

(56) References Cited

U.S. PATENT DOCUMENTS 3,022,305 A 1/1965 Carboni
4,559,369 A 12/1985 Bauman
(Continued)

FOREIGN PATENT DOCUMENTS

WO WO2004047568 A1 6/2004
WO WO2009134227 A1 11/2009
(Continued)

OTHER PUBLICATIONS

Knall, Chem. Commun., 2013, 49, pp. 7325-7327 (Year: 2013).*
(Continued)

*Primary Examiner* — Robert C Boyle
(74) *Attorney, Agent, or Firm* — Nguyen Tarbet (57) ABSTRACT

A method of making a solid composition by reacting a tetrazine component and a polymer component through an inverse electron demand Diels-Alder reaction (IEDDA). The solid composition formed by the Diels-Alder reaction is in the form of either a foam or a powder depending on the functional groups of the tetrazine component. The polymer component can be various substituted polybutadienes, mixtures of stereoisomeric polydienes, and polybutadiene copolymers. The gas produced during the reaction is nitrogen, hence, the solid composition can be considered a greener (Continued)

material than polyurethanes, which involves carbon monoxide release during the course of the reaction. The aromatized polymer can act as a built in anti-oxidant with up to two hydrogen atom equivalents per dihydropyridazine group. The polymers of dihydropyridazines are converted to polymeric pyridazine groups by aromatization and the aromatic polymer becomes more stable.

10 Claims, 3 Drawing Sheets

(51) Int. Cl.
  C08C 19/22      (2006.01)
  C08C 19/38      (2006.01)
  C08C 19/06      (2006.01)
  C08F 136/06     (2006.01)
(52) U.S. Cl.
  CPC ............ *C08C 19/38* (2013.01); *C08F 136/06* (2013.01); *C08J 2201/026* (2013.01); *C08J 2315/02* (2013.01); *C08J 2347/00* (2013.01)

(56) References Cited

U.S. PATENT DOCUMENTS

| | | | |
|---|---|---|---|
| 4,704,408 A | 11/1987 | Krug | |
| 5,034,463 A * | 7/1991 | Brokken-Zijp | C08G 79/00 252/519.2 |
| 6,534,611 B1 * | 3/2003 | Darling | C08F 8/46 526/261 |
| 6,866,045 B1 | 3/2005 | Maillard et al. | |
| 2004/0262217 A1 | 12/2004 | Mori et al. | |
| 2004/0266940 A1 | 12/2004 | Issari | |
| 2009/0253015 A1 | 10/2009 | Onodera et al. | |
| 2009/0264544 A1 | 10/2009 | Loy | |
| 2010/0016545 A1 * | 1/2010 | Wiessler | C07D 221/22 530/300 |
| 2011/0171076 A1 | 7/2011 | Fansler et al. | |
| 2013/0253120 A1 * | 9/2013 | Kulkarni | C07D 237/08 524/447 |
| 2013/0261272 A1 * | 10/2013 | Herzog | B60C 1/0016 526/194 |
| 2014/0113844 A1 * | 4/2014 | Haque | C10M 143/04 508/131 |
| 2014/0371396 A1 | 12/2014 | Van Rheenen et al. | |

FOREIGN PATENT DOCUMENTS

| | | |
|---|---|---|
| WO | WO2015121336 A1 | 8/2015 |
| WO | WO2015154078 A1 | 10/2015 |

OTHER PUBLICATIONS

International Search Report Issued for PCT Application No. PCT/US16/46199 dated Jan. 26, 2017.
International Search Report Issued for PCT Application No. PCT/US17/24702 dated Jun. 27, 2017.
International Search Report Issued for PCT Application No. PCT/US17/25110 dated Jun. 22, 2017.
International Search Report Issued for PCT Application No. PCT/US17/40098 dated Sep. 29, 2017.
Fukuzumi, S.; Yuasa, J.; Suenobu, T., Scandium Ion-Promoted Reduction of Heterocyclic N:N Double Bond. Hydride Transfer vs Electron Transfer. J. Am. Chem. Soc. 2002, 124, (42), 12566-12573.
Audebert, P.; Sadki, S.; Miomandre, F.; Clavier, G., First example of an electroactive polymer issued from an oligothiophene substituted tetrazine. Electrochem Commun 2004, 6, (2), 144-147.
Polezhaev, A. V.; Maciulis, N. A.; Chen, C.-H.; Pink, M.; Lord, R. L.; Caulton, K. G., Tetrazine Assists Reduction of Water by Phosphines: Application in the Mitsunobu Reaction. Chem.—Eur. J. 2016, 22, (39), 13985-13998.
Jaiswal, S.; Varma, P. C. R.; O'Neill, L.; Duffy, B.; McHale, P., An investigation of the biochemical properties of tetrazines as potential coating additives. Mat Sci Eng C-Mater 2013, 33, (4), 1925-1934.
Cerna, A.; Cibulkova, Z.; Simon, P.; Uhlar, J.; Lehocky, P., DSC study of selected antioxidants and their binary mixtures in styrene-butadiene rubber. Polym. Degrad. Stab. 2012, 97, (9), 1724-1729.
Vazquez et al. Mechanism-Based Fluorogenic trans-Cyclooctene-Tetrazine Cycloaddition. Angew. Chem. Int. Ed. 2017, 56, 1334-1337.
Heldmann et al. Synthesis of Metallated (Metal = Si, Ge, Sn) Pyridazines by Cycloaddition of Metal Substituted Alkynes to 1,2,4,5-Tetrazine. Tetrahedron Letters, vol. 38, No. 33, pp. 5791-5794, 1997.
Sauer et al. 1,2,4,5-Tetrazine: Synthesis and Reactivity in [412] Cycloadditions. Eur. J. Org. Chem. 1998, 2885-2896.
Kang, JW et al. Low-Loss Fluorinated Poly(Arylene Ether Sulfide) Waveguides with High 12.33Thermal Stability. Journal of Lightwave Technology. vol. 19. No. 6. Jun. 2001, pp. 872-875.
Loy D.A., Tetrazines for hydrogen storage. 59-th Annual Report on Research 2014 [online]. 55-57 Report 50941-ND7. 2014 (2014) [retrieved on Aug. 30, 2017). retrieved from the Internet: <https:llacswebcontent.acs.org/prfar/2014/ Paper13084.html>. pp. 1-5.
Al-Malaika, S. In Reactive antioxidants for polymers, 1997; Blackie: 1997; pp. 266-302.
Heim, K. C. Natural polyphenol and flavonoid polymers. In: Cirillo G, Iemma F, eds. Antioxidant Polymers: Synthesis, Properties and Applications. Hoboken, NJ: Scrivener Publishing LLC and John Wiley & Sons Ltd; 2012, pp. 23-54.
Lei, H.; Huang, G.; Weng, G., Synthesis of a New Nanosilica-Based Antioxidant and Its Influence on the Anti-Oxidation Performance of Natural Rubber J. Macromol. Sci., Part B: Phys. 2013, 52, (1), 84-94.
Solera, P., New trends in polymer stabilization. J. Vinyl Addit. Technol. 1998, 4, (3), 197-210.
Alge et al. Synthetically Tractable Click Hydrogels for Three-Dimensional Cell Culture Formed Using Tetrazine—Norbornene Chemistry. Biomacromolecules. 2013, 14, 949-953.
Desai et al. Versatile click alginate hydrogels crosslinked via tetrazineenorbornene chemistry. Biomaterials 50 (2015) 30-37.
Sukwon Jung and Hyunmin Yi. An Integrated Approach for Enhanced Protein Conjugation and Capture with Viral Nanotemplates and Hydrogel Microparticle Platforms via Rapid Bioorthogonal Reactions. Langmuir. 2014, 30, 7762-7770.
Kawamoto et al. Dual Role for 1,2,4,5-Tetrazines in Polymer Networks: Combining Diels-Alder Reactions and Metal Coordination To Generate Functional Supramolecular Gels. ACS Macro Lett. 2015, 4, 458-461.
Knall et al. Inverse electron demand Diels-Alder (iEDDA) functionalisation of macroporous poly(dicyclopentadiene) foams. Chem. Commun., 2013, 49, 7325.
Liu et al. Theoretical Elucidation of the Origins of Substituent and Strain Effects on the Rates of Diels-Alder Reactions of 1,2,4,5-Tetrazines. J. Am. Chem. Soc. 2014, 136, 11483-11493.
Liu et al. Modular and orthogonal synthesis of hybrid polymers and networks. Chem. Commun., 2015, 51, 5218.
Tork et al. Molecular Dynamics of the Diels-Alder Reactions of Tetrazines with Alkenes and N2 Extrusions from Adducts. J. Am. Chem. Soc. 2015, 137, 4749-4758.
Zhang et al. Interfacial Bioorthogonal Cross-Linking. ACS Macro Lett. 2014, 3, 727-731.

* cited by examiner

Cis-Polydienes

R' = H, CH$_3$, Ph, Cl

R$_1$, R$_2$ = alkyl, aryl, halide, ether, amine, thiol ether, carboxy amide, pyridyl, carboxy ester, guanidinyl, hydrazinyl

Polycyclodienes

R' = H, CH$_3$, Ph, Cl

R$_1$, R$_2$ = alkyl, aryl, halide, ether, amine, thiol ether, carboxy amide, pyridyl, carboxy ester, guanidinyl, hydrazinyl Trans-Polydienes R' = H, CH$_3$, Ph, Cl R$_1$, R$_2$ = alkyl, aryl, halide, ether, amine, thiol ether, carboxy amide, pyridyl, carboxy ester, guanidinyl, hydrazinyl

FIG. 5

GREEN CHEMISTRY METHOD OF SYNTHESIZING POLYMER STRUCTURES THAT CAN FUNCTION AS A BUILT-IN ANTIOXIDANT

CROSS REFERENCE

This application claims priority to U.S. Provisional Patent Application No. 62/203,828, filed Aug. 11, 2015 and U.S. Provisional Patent Application No. 62/269,564, filed Dec. 18, 2015, the specification(s) of which is/are incorporated herein in their entirety by reference.

BACKGROUND OF THE INVENTION

Conventional foams are prepared by adding chemical or physical blowing agents to a polymer film, or as in the case of polyurethane, by releasing carbon dioxide as a byproduct of its synthesis. The present invention provides an alternative method for synthesizing polymer foams, which are not reliant upon polyurethane chemistry or the need for additional chemical or physical blowing agents. The benefit of the chemistry described herein is that the foam is generated without the need of additional chemical or physical blowing agents through nitrogen gas production during the chemical reaction that forms the polymer itself. Nitrogen is a more benign gas than those used in many physical blowing agents and has a lower global warming potential than carbon dioxide, thereby making it a green alternative to other foams currently being produced. The present invention also eliminates the need for isocyanates, which are a major component of polyurethane synthesis and a known allergen and sensitizer. By eliminating the isocyanates, large scale processing of foams can be made safer for those in the production facility. In addition to foams, the polymers described herein can find other uses, such as films, coatings, and adhesives.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

In one embodiment, the present invention features a method of making a solid composition by reacting a tetrazine component and a polymer component. The polymer component may be an alkene, a polybutadiene component, or a substituted polybutadiene. Examples of the polybutadiene component include, but are not limited to, a cis-polybutadiene, a trans-polybutadiene, a predominately vinylic polybutadiene, a polycyclohexadiene, a polychloroprene, a poly-2-phenylbutadiene, a poly-isoprene, a mixture of cis and trans-polybutadiene isomers, a poly(butadiene-block-styrene), a poly(butadiene-co-acrylonitrile) or poly-acrylonitrile-butadiene-styrene). In other embodiments, the substituted polybutadiene may comprise a terminal nucleophilic group such as a hydroxyl, a thiol or an amine. According to some embodiments, a first product produced from a reaction of the tetrazine component and the polymer component is further oxidized to form a poly-aromatic component. In some embodiments, the poly-aromatic component functions as a built-in antioxidant forming a stable polymer component.

In another embodiment, the present invention features a method of making a solid composition by reacting a tetrazine end-capped polymer component and a multiple bond component. The multiple bond component may comprise a strained olefin such as a norbornene, acyclooctene, or a divinyl ether.

A further embodiment of the present invention features a method of forming a class of oxidation resistant linear polymers and networked foams through an inverse electron demand (IEDA) reaction between substituted tetrazines with polyenes and oligoenes. Neat mixing of polyenes and oligoenes with miscible tetrazine species results in the formation of networked foams through the cheletropic elimination of nitrogen gas following the IEDA cycloaddition reaction. Both thermoplastic and thermoset foams are possible to generate through this chemistry, and if the tetrazine is substituted with a halide, post-functionalization of the foams is possible with nucleophilic species in both gas and solvent phase. According to some embodiments, solvent run reactions of tetrazine with polyenes and oligoenes produce linear polymers with glass transition temperatures (Tg) exceeding 130° C. Advantageously, these polymers can be made from cheap and readily available feedstocks such as polybutadienes, providing the ability to easily convert liquid elastomers into a variety of new materials whose properties can be changed by altering the substituting group(s) on the tetrazine.

These new materials represent an entirely new form of polymer/copolymer blend which can be generated from low cost starting material, and contains a pyridazine heterocyclic ring on many of the repeat units along the backbone. In some embodiments, both reactions through neat mixing and solvent based systems result in the creation of a dihydropyridazine repeat unit within the copolymer. In a preferred embodiment, the dihydropyridazine when exposed to an oxidant oxidizes to a fully aromatic heterocyclic ring, which means that these materials contain their own built-in antioxidant. Dependent on the reactivity of the tetrazine, it is possible to nearly completely functionalize the polyene/oligoene backbone based on NMR integration, meaning that this chemistry can be used to create polymers which have a high resistance to oxidation. In addition to foams, the materials generated by the present invention can be useful in a variety of applications which include, but are not limited to insulation, structural materials, catalyst support systems, and filtration of metals, nucleophiles and electrophiles.

One of the unique and inventive technical features of the present invention is that the polymers formed with the dihydropyridiazine groups are an antioxidant with an effective concentration that is orders of magnitude higher than what is possible through traditional dissolution addition of antioxidants. As the polymers of dihydropyridazines are converted to pyridazine groups through radical oxidation, the polymer becomes more stable. Without wishing to limit the invention to any theory or mechanism, it is believed that the technical feature of the present invention advantageously provides for extra stability that can extend the lifetime of the polydienes considerably, even with small amounts of tetrazine incorporation. The tetrazine modified polymer can act as a built in anti-oxidant with up to two hydrogen atom equivalents per dihydropyridazine group. None of the presently known prior references or work has the unique inventive technical feature of the present invention.

BRIEF DESCRIPTION OF THE DRAWINGS

The features and advantages of the present invention will become apparent from a consideration of the following detailed description presented in connection with the accompanying drawings in which.

DETAILED DESCRIPTION

Figure 1A:
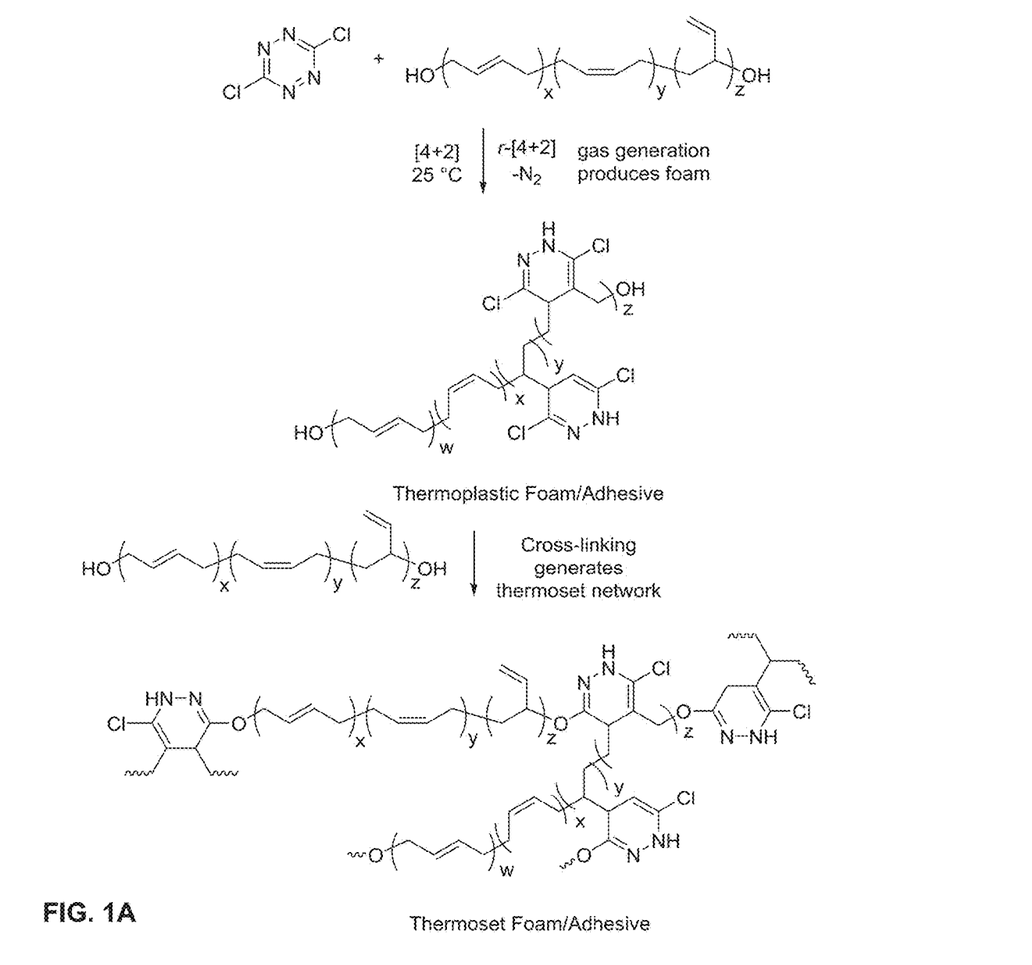
FIG. 1A shows a reaction schematic of an inverse electron demand Diels-Alder (IEDDA) reaction between 3,6-dichloro-1,2,4,5-tetrazines and poly 1,3-butadiene to produce a polymer foam based on 1-(3,6-disubstituted-dihydropyridazin-5-yl)ethane, 3,6-disubstituted methylenedihydropyridazine-4,5-diyl-methylene and 2-butene-1,4-diyl constituents.
Figure 1B:
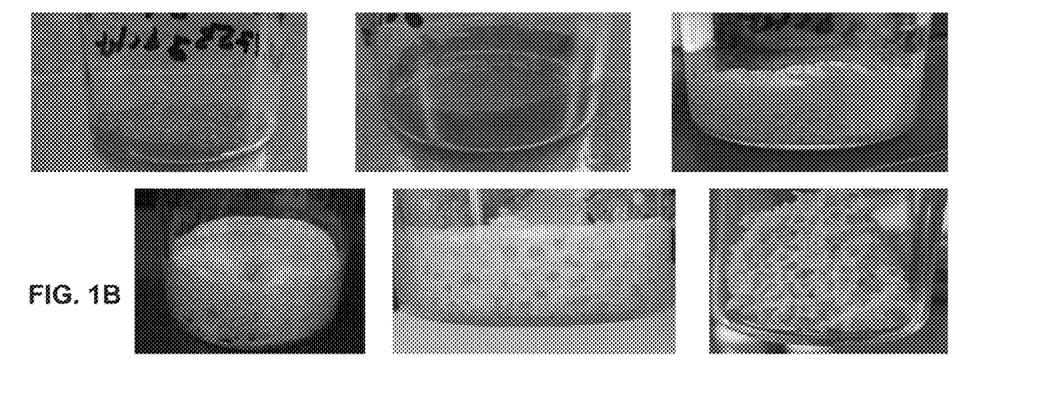
FIG. 1B shows the growth of the foam over a 30-60 minute period at room temperature, followed by its appearance after 24 hrs (left to right and top to bottom).
Figure 2:
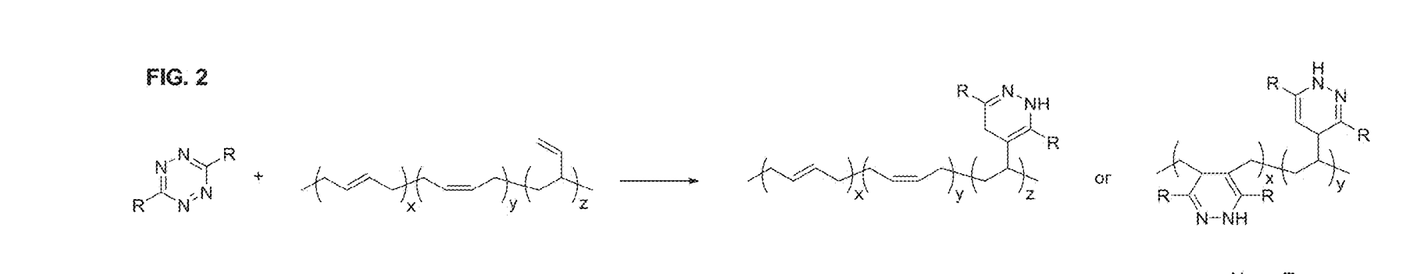
FIG. 2 shows a reaction schematic of an inverse electron demand Diels-Alder (IEDDA) reaction between 3,6-disubstituted-1,2,4,5-tetrazines and polybutadiene to produce a poly((3,6-disubstituted-dihydropyridazin-5-ylethane)-co-butadiene) or a 3,6-disubstituted-poly(methylene-di hydropyridazine-4,5-diyl-methylene-co-butadiene).
Figures 3, 4:
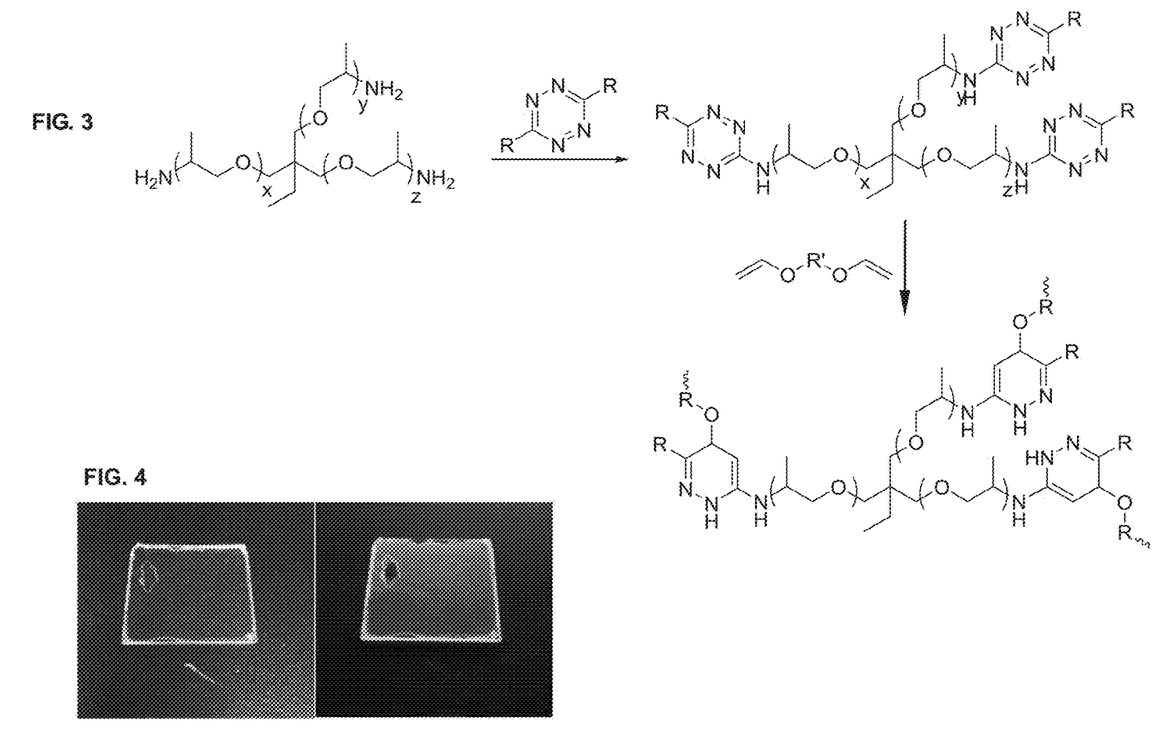
FIG. 3 shows reaction scheme for making thermoset foams using polyetheramines.
FIG. 4 shows polymer film from the reaction between 3,6-dimethyl-1,2,4,5-tetrazine-3,6-dicarboxylate and poly (1,3-butadiene).
Figure 5:
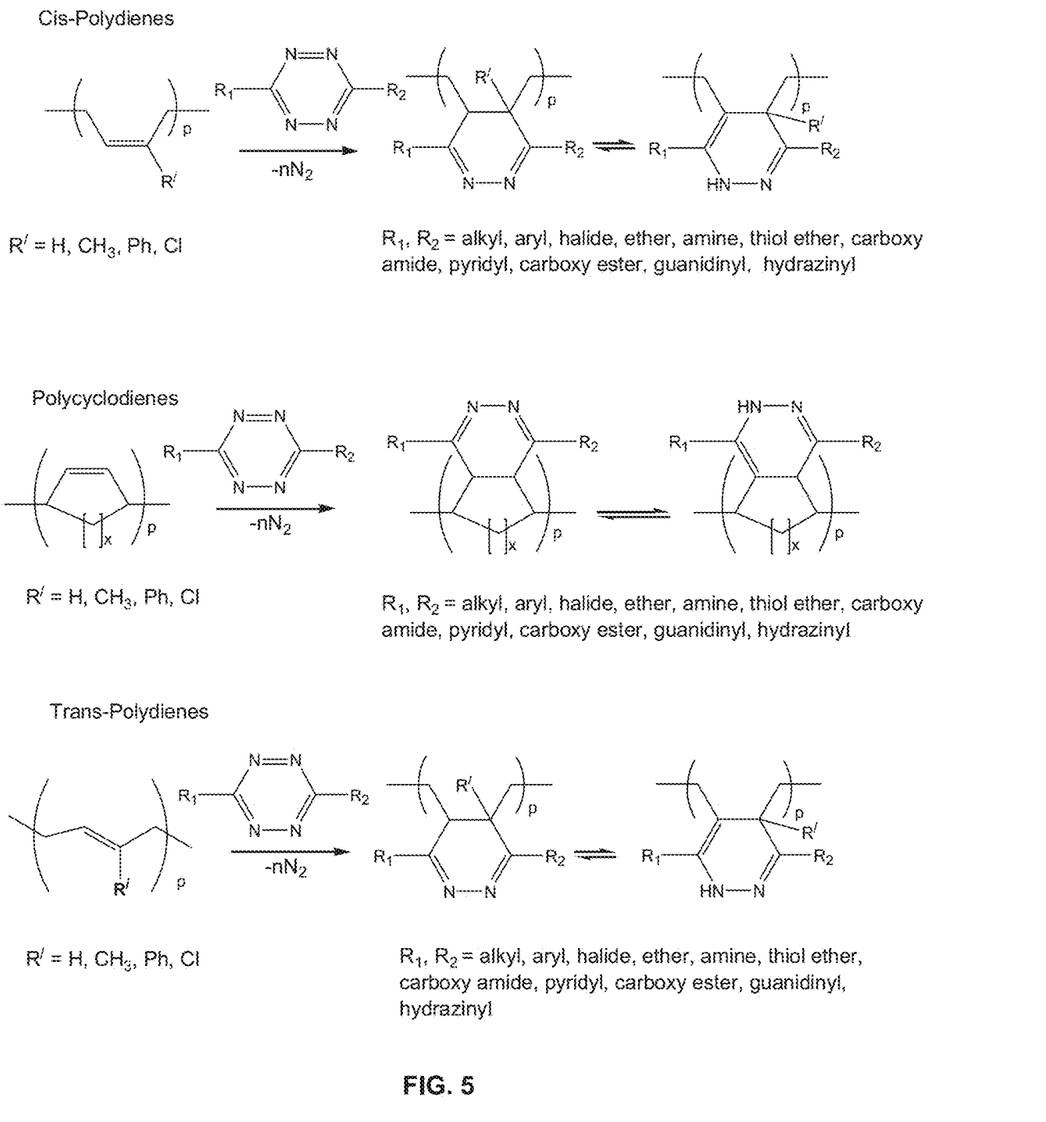
FIG. 5 shows a reaction schematic of an inverse electron demand Diels-Alder (IEDDA) reaction between 3,6-disubstituted-1,2,4,5-tetrazines and various polydienes to produce methylene-dihydropyridazine-4,5-diyl-methylene polymers in tautomeric mixtures.

Referring to FIGS. 1-5, the present invention features a method of making a solid composition. In some embodiments, the method comprises reacting a tetrazine component and a polymer component. In some embodiments, the tetrazine component comprises:

wherein $R_1$=alkyl, aryl, halide, ether, amine, thiol ether, amides, ketone, pyridyl, ester, guanidinyl or hydrazinyl; and $R_2$=alkyl, aryl, halide, ether, amine, thiol ether, ketone, amides, pyridyl, ester, guanidinyl or hydrazinyl.

In some embodiments, the halide can be a fluoride, a chloride, a bromide or an iodide. For example, the halide may be a chloride. According to some embodiments, the alkyl can be a methyl, an ethyl, a propyl, or a butyl group. According to other embodiments, the aryl may comprise a phenyl, a tolyl, a xylyl, a pyridyl, a pyrimidyl, a pyrazolyl, a triazolyl, a tetrazolyl, a napthyl, a thienyl, or an indolyl group.

In further embodiments, the non-tetrazine substituent on the ether may comprise a methyl, an ethyl, a propyl, an isopropyl, a butyl, a pentyl, a hexyl, a heptyl, an octyl, a nonyl, a decyl, an undecyl, a dodecyl, a tridecyl, a tetradecyl, a pentadecyl, a hexadecyl, a heptadecyl, an octadecyl, a nonadecyl, a dodecyl eicosane, or any isomers of the previously listed groups. In some embodiments, the non-tetrazine substituents on the amine may comprise a methyl, ethyl, ethanol, ethylamine, propyl, propanol, propylamine, butyl, butanol, butylamine, pentyl, pentanol, pentylamine, hexyl, hexanol, hexylamine, heptyl, heptanol, heptylamine, octyl, octanol, octylamine, nonyl, nonylamine, decyl, decylamine, undecyl, dodecyl, tridecyl, tetradecyl, pentadecyl, hexadecyl, heptadecyl, octadecyl, nonadecyl, dodecyl eicosane, or any isomers of the previously listed groups. In other embodiments, the non-tetrazine substituent on the ketone may comprise a methyl, an ethyl, a propyl, a butyl, a pentyl, a hexyl, a heptyl, an octyl, a nonyl, a decyl, an undecyl, a dodecyl, a tridecyl, a tetradecyl, a pentadecyl, a hexadecyl, a heptadecyl, an octadecyl, a nonadecyl, a dodecyl eicosane, or any isomers of the previously listed groups, a phenyl, a tolyl, a xylyl, a pyridyl, a pyrimidyl, a pyrazolyl, a triazolyl, a tetrazolyl, a napthyl, a thienyl, or a indolyl ketone group. In preferred embodiments, $R_1$ and $R_2$ can be the same or any combination of groups from the above.

According to some embodiments, the polymer components of the present invention may comprise a substituted polybutadiene component. For example, in some embodiments, the substituted group may comprise a hydrogen, an alkyl, an aryl or a halide. According to one embodiment, the alkyl substituted group of the polybutadiene component may comprise a methyl, an ethyl, a propyl or a butyl, a pentyl, a hexyl, a heptyl, an octyl, a nonyl, a decyl, an undecyl, a dodecyl, a tridecyl, a tetradecyl, a pentadecyl, a hexadecyl, a heptadecyl, an octadecyl, a nonadecyl, a dodecyl eicosane group, or any isomers of the previously listed groups. In some embodiments, the aryl substituted group of polybutadiene component may comprise a phenyl, a tolyl, a xylyl, a pyridyl, a pyrimidyl, a pyrazolyl, a triazolyl, a tetrazolyl, a napthyl, a thienyl, or an indolyl group. In other embodiments, the halide substituted group of polybutadiene component may comprise a fluoride, a chloride, a bromide or an iodide group. In still other embodiments, the polybutadiene component may comprise a cyclic polybutadiene such as a polycyclohexadiene. In further embodiments, the substituted polybutadiene component may comprise an alkylated polybutadiene, such as polyisoprene, or a halide substituted polybutadiene, such as polychloroprene, or an arylated polybutadiene, such as poly-2-phenylbutadiene, a predominately vinylic polybutadiene, or a stereoisomeric polybutadiene, such as a cis-polybutadiene isomer or a trans-polybutadiene isomer.

In some embodiments, the polymer component may comprise a polybutadiene component having at least one or more of the following structures:

wherein $R'$=hydrogen, alkyl, aryl or halide; $R''$=hydrogen, alkyl, aryl or halide; q, u, v=1-100000, 500-50000, or 1000-80000, wherein q, u, and v can be independently the same or different; and a=1-4.

In some embodiments, the solid composition formed by reacting a tetrazine component and a polymer component is a foam. In some embodiments, the foam can be a thermoplastic or a thermoset. The thermoplastic/thermoset foams can be used for insulation, cushioning, and structural support. The solid composition made through this new chemistry also includes thermoplastic/thermoset adhesive, films and electrofluorochromic devices.

According to some embodiments, the present invention features a method of making a solid composition comprising reacting a tetrazine component and a polymer component. In some preferred embodiments, the polymer compound may comprise a mixture of stereoisomeric substituted polybutadiene components. The mixture of stereoisomeric substituted polybutadiene component may comprise a mixture of cis- and trans-polybutadiene isomers. In other embodiments, the mixture may further comprise a predominately vinylic polybutadiene.

According to other embodiments, the cis and trans-polybutadiene isomers can have at least one of the following structures:

wherein $R^1$, $R^2$, $R^3$, $R^4$, $R^5$, $R^6$, $R^7$, or $R^8$=hydrogen, alkyl, aryl or halide; b, c, t, s, f, g, i, j, k, w=the number of repeat units in a block or relative number of units in a random copolymer, wherein each letter can be independently same or different with certain numerical values of 1-25,000, 500-25,000, 1000-25,000, 2000-25,000 or 5000-25,000.

In some embodiments, the present invention features a method of making a solid composition comprising reacting a tetrazine component and a polymer component. In other embodiments, the polymer compound may comprise a copolymer polybutadiene component. The copolymer polybutadiene component may comprise a block copolymer polybutadiene such as a polybutadiene-block-styrene), a diene monomer unit in a random copolymer polybutadiene component, such as a poly(butadiene-co-acrylonitrile), or a graft polymer polybutadiene such as a polyacrylonitrile-butadiene-styrene).

According to some embodiments, the copolymer polybutadiene component of the present invention may comprise the following structure:

wherein $R^9$=hydrogen, alkyl, aryl or halide; $R^{10}$=aryl, nitrile, halide or ester; and d, e=the number of repeat units in a block or relative number of units in a random copolymer wherein each letter can be independently same or different with certain numerical values of 1-25,000, 500-25,000, 1000-25,000, 2000-25,000 or 5000-25,000.

In some embodiments, the olefin component may comprise a strained olefin. For example, the olefin component comprises a norbornene and a trans-cyclooctene. In other embodiments, the polymer component may comprise a butadiene component. The butadiene component can have at least one or more of the following structures:

wherein h, A, l, B=less than 90%; wherein each letter can be independently same or different; wherein o, C=10-90+%; wherein each letter can be independently same or different; wherein h+l+o=100% and A+B+C=100%; wherein $R_3$, $R_4$, $R_5$=a nucleophilic group such as a hydroxyl, a thiol or an amine, and wherein each group can be independently same or different. In further embodiments, the butadiene component may comprise a terminally substituted nucleophilic group, such as a hydroxy, an amine or a thiol groups.

In some embodiments, the solid composition formed by reacting a tetrazine component and a polymer component is a foam or powder. In one embodiment, the foam can be a thermoplastic or a thermoset. The thermoplastic/thermoset foams can be used for insulation, cushioning, and structural support. The solid composition made through this new chemistry also includes thermoplastic/thermoset adhesive, films and electrofluorochromic devices.

The method of making a solid composition by reacting a tetrazine component and a polymer component is performed at a temperature ranging from about 0-200° C., for instance, in the range of about 20° C. to 30° C.

The method of making a solid composition comprises adding a tetrazine component as a diene of the Diels-Alder reaction in a reaction vessel, adding the polymer component as a dienophile of the Diels-Alder reaction in the same reaction vessel and mixing the tetrazine component and the polymer component into a paste or a solution. In some embodiments, the paste or solution forms into a foam. In other embodiments, $R_1$ and $R_2$ can be a fluoride, a chloride, a bromide or an iodide. In still other embodiments, $R_1$ and $R_2$ can be an alkoxy, an alkylamine or an alkylthiol. In further embodiments, $R_1$ and $R_2$ can be an alkyl, an aryl, a halide, an ether, an amine, a thiol ether, a ketone, an amide, a pyridyl, an ester, a guanidyl or a hydrazinyl group.

In some embodiments, the paste may remain a mixture or form into a powder. In other embodiments, $R_1$ and $R_2$ can be an ester. In further embodiments, the reaction requires solvent such as tetrahydrofuran to proceed to completion when $R_1$ and $R_2$ are esters.

In one embodiment, the polymer may be cast from a solution into a clear, colorless film that can fluoresce bright blue under ultraviolet light. In another embodiment, the powder may be converted to electrofluorochromic devices.

Advantageously, at least one equivalent of nitrogen gas is produced during the reaction of a tetrazine component and a polymer component for every equivalent of tetrazine used.

Therefore, the solid composition formed by the reaction of a tetrazine component and a polymer component can be considered a greener material than polyurethanes and the resulting foams provide an alternative to polyurethanes.

In the present invention, using tetrazines instead of isocyanates reduces any form of industrial risk associated with working on a large-scale manufacturing process with isocyanates. Therefore, a carbon dioxide gas is not produced during the reaction of a tetrazine component and a polymer component unlike during the production of polyurethane. Isocyanates are hazardous to work with because of their allergenic and sensitizing properties. Isocyanates may cause respiratory failure when exposed to even a small amount.

In some embodiments, the present invention features a method of making a solid composition, the method comprises reacting a tetrazine component and a polymer component. In some embodiments, the tetrazine component comprises:

wherein $R_1$=alkyl, aryl, halide, ether, amine, thiol ether, ketone, amide, pyridyl, ester, guanidinyl or hydrazinyl; and $R_2$=alkyl, aryl, halide, ether, amine, thiol ether, ketone, amides, pyridyl, ester, guanidinyl or hydrazinyl. The polymer component may comprise at least one or more of the following structures:

wherein R′=hydrogen, alkyl, aryl or halide; R″=hydrogen, alkyl, aryl or halide; q, u, v=1-100000; 500-50000 or 1000-80000; wherein each number can be independently same or different; a=1-4; $R^1$, $R^2$, $R^3$, $R^4$, $R^5$, $R^6$, $R^7$, $R^8$=hydrogen, alkyl, aryl or halide; b, c, d, e, t, s, f, g, i, j, k, w=the number of repeat units in a block or relative number of units in a random copolymer wherein each letter can be independently same or different with certain numerical values of 1-25,000, 500-25,000, 1000-25,000, 2000-25,000 or 5000-25,000; $R^9$=hydrogen, alkyl, aryl or halide; and $R^{10}$=aryl, nitrile, halide or ester. In some embodiments, the $R_4$, $R_5$, $R_6$ halide comprises a fluoride, a chloride, a bromide or an iodide.

In further embodiments, the polymer component comprises:

wherein h=less than 90%, l=less than 90%, o=10-90+%, wherein h+l+o=100%, and wherein nitrogen gas is released when performing the reaction.

The solid foam is formed between minutes to hours after mixing of the tetrazine component and a polymer component. In some embodiments, the solid is formed after within 1 hour after mixing of the two components. After mixing the two components, there is window of approximately 30-60 minutes to manipulate the material for molding or use as an adhesive.

In some embodiments, the method of making a solid composition comprises reacting a tetrazine end capped polymer component and a multiple bond component. As an example, the tetrazine end capped polymer component comprises:

wherein $R_6$=alkyl, aryl, halide, ether, amine, thiol ether, ketone, amide, pyridyl, ester, guanidine or hydrazine; $R_7$=alkyl, aryl, halide, ether, amine, thiol ether, ketone, amide, pyridyl, ester, guanidine or hydrazine; $R_8$=alkyl, aryl, halide, ether, amine, thiol ether, ketone, amide, pyridyl, ester, guanidine or hydrazine; x, y, z=1-1000, 10-1000, 100-1000 or 500-1000; wherein each number can be independently same or different; and wherein the multiple bond component comprises one or more alkenes or alkynes.

In some embodiments, the multiple bond component comprises a strained olefin such as a norbornene or a trans-cyclooctene. In other embodiments, the multiple bond component is an alkene ether, such as a divinyl ether.

In some embodiments, the method of making a solid composition comprises adding a tetrazine end capped polymer component as a diene of the Diels-Alder reaction in a reaction vessel, adding a multiple bond component as a dienophile of the Diels-Alder reaction in the same reaction vessel, and mixing the tetrazine component and the polymer component into a paste or solution.

In some embodiments, the tetrazine end capped polymer component comprises:

wherein $R_6$=alkyl, aryl, halide, ether, amine, thiol ether, ketone, amide, pyridyl, ester, guanidinyl or hydrazinyl; $R_7$=alkyl, aryl, halide, ether, amine, thiol ether, ketone, amide, pyridyl, ester, guanidinyl or hydrazinyl; $R_8$=alkyl, aryl, halide, ether, amine, thiol ether, ketone, amide, pyridyl, ester, guanidinyl or hydrazinyl; x, y, z=1-1000, 10-1000, 100-1000 or 500-1000; and wherein each number can be independently same or different.

In other embodiments, the multiple bond component comprises any of the following structures:

wherein $R_9$=alkyl, ether, siloxane, carbonate, carbamate, epoxy or aromatic. In further embodiments, the multiple bond component is not limited to the diether as shown above. For example, the multiple bond component may comprise:

wherein E, F, G=1-1000, 10-1000, 100-1000, or 500-1000; and wherein each number can be independently the same or different.

In other embodiments, the multiple bond component comprises a strained olefin such as a norbornene or a trans-cyclooctene. In still other embodiments, the multiple bond component comprises an alkene ether such as a divinyl ether.

In some embodiments, the tetrazine component may comprise:

wherein $R_{10}$=alkyl, aryl, halide, ether, amine, thiol ether, ketone, amide, pyridyl, ester, guanidinyl, or hydrazinyl; $R_{12}$=alkyl, aryl, halide, ether, amine, thiol ether, ketone, amide, pyridyl, ester, guanidinyl or hydrazinyl; $R_{11}$=alkyl, ether, siloxane, carbonate, carbamate, epoxy or aromatic, and A=nucleophilic groups such as hydroxy, amine or thiol.

In some embodiments, the first product produced from a reaction of the tetrazine component and the polymer component is further oxidized to form a poly-aromatic component. The first product may comprise at least one or more of the following structures:

wherein m, n=1-100000; 500-50000 or 1000-80000; wherein each number can be independently same or different; $R_1$=alkyl, aryl, halide, ether, amine, thiol ether, ketone, amide, pyridyl, ester, guanidinyl or hydrazinyl; and $R_2$=alkyl, aryl, halide, ether, amine, thiol ether, ketone, amide, pyridyl, ester, guanidinyl or hydrazinyl. In further embodiments, $R_1$ and $R_2$ can be the same or any combination of groups from above. In some embodiments, the first product may exist as a mixture of tautomers.

According to some embodiments, the poly-aromatic component, formed by the aromatization of the first product may comprise at least one or more of the following structures:

wherein m, n=1-100,000; 500-50,000 or 1000-80,000; wherein each number can be independently same or different; $R_1$=alkyl, aryl, halide, ether, amine, thiol ether, ketone, amide, pyridyl, ester, guanidinyl or hydrazinyl; and $R_2$=alkyl, aryl, halide, ether, amine, thiol ether, ketone, amide, pyridyl, ester, guanidinyl or hydrazinyl. In some embodiments, $R_1$ and $R_2$ can be the same or any combination of groups from above.

In a preferred embodiment, the modification of polymers with the dihydropyridiazine groups formed by the Carboni-Lindsey reaction converts the polymer into an antioxidant that is effectively in orders of magnitude higher concentration than is possible through traditional dissolution addition of antioxidants. As the polymers of dihydropyridazines are converted to pyridazine groups through free radical oxidation, the polymer becomes more stable. This extra stability may extend the lifetime of polydienes considerably, even with small amounts of tetrazine incorporation.

The dihydropyridazine group formed by the cycloaddition of the tetrazines with polydienes or non-aromatic C=C bonds attached to any polymer can act as a built in antioxidant with up to two hydrogen atom equivalents per dihydropyridazine group.

EXAMPLES

The following are exemplary synthetic procedures, and are included here as non-limiting examples only.

Example 1

To a 20 mL plastic weighing cup was added polydutadiene (hydroxy functionalized, 1200 Mn) (0.2714 g, 5.026×$10^{-3}$ mol) and 3,6-dichloro-1,2,4,5-tetrazine (0.1885 g, 1.249×$10^{-3}$ mol). The mixture was stirred until the tetrazine was completely dissolved and gas generation could be observed in the bright orange foaming paste. The orange foam continued to rise under an open air environment at 25° C. for an approximately 30 additional minutes before ceasing to grow any further. After 24 hrs, the color of the foam had changed to a light peach-yellow color and the foam was observed to fluoresce yellow under UV light. Mass of product after 24 hrs (0.4202 g, 98.9%) Elemental Analysis: C: 65.57, H: 7.95, N: 8.73, O: 5.01, Cl: 11.66 FT-IR (ATR, SiO$_2$): cm$^{-1}$=3235.75, 3084.13, 3011.00, 2921.41, 2852.73, 1678.36, 1446.62, 1311.15, 1220.50, 1161.98, 1074.08, 969.01, 914.56, 733.11, 665.26, 629.72, 621.11, 585.52, 568.52, 531.93, 498.59, 471.64 DSC: Tg° C.=35.42° C.

Example 2

To a 20 mL glass scintillation vial was added polybutadiene (20% 1,2 addition, 5000 avg Mn) (0.1045 g, 1.935 mmol based on mer unit) and dimethyl 1,2,4,5-tetrazine-3,6-dicarboxylate (0.4153 g, 2.096 mmol). The reagents were dissolved in THF (15 mL), and the dark red transparent solution was then heated to 60° C. for 5 hours. The resulting light-transparent red solution was cooled to 25° C. before being poured into diethyl ether (150 mL) after which a white precipitate crashed out of the now light pink solution. The precipitate was collected with vacuum filtration, rinsed with diethyl ether, and dried under high vac to yield 0.379 g, 91% of a white powder that fluoresces bright blue under UV light. Elemental Analysis Calculated (1:1 diene to tetrazine): C, 57.13, H, 6.39, N, 11.10, O, 25.37. Experimental: C, 54.28, H, 5.71, N, 11.50, O, 28.51 $^1$H NMR (400 MHz, CDCl$_3$): δ=8.54 (s br, 1H, NH), 5.70 (s br, 0.33H, butadienealkene H), 5.28 (s br, 0.44H, pyridazine C—H), 3.84 (s br, 6H, ester CH$_3$) 0.53-3.70 (m br, 4H, CH$_2$) FT-IR (ATR, Si): cm$^{-1}$=3368.42, 3008.56, 2952.88, 2850.42, 1897.56, 1704.50, 1639.28, 1591.78, 1438.53, 1331.08, 1257.12, 1195.86, 1160.71, 1107.38, 957.23, 867.85, 817.81, 774.75, 706.68, 628.94, 613.18, 571.05, 543.53, 514.63, 473.75, 447.43, 435.86, 416.57 UV-Vis: $\lambda_{max}$ nm=346, 343.5. Fluorescence emission maxima (345 nm excitation): nm=433, 440, 449-455.

Example 3

Hydroxyl Terminated Polybutadiene and 12.4 Mol % Dichlorotetrazine

To a 20 mL plastic weighing cup was added polydutadiene (hydroxyl functionalized, 1200 Mn) (0.2722 g, 5.041×$10^{-3}$ mol) and 3,6-dichloro-1,2,4,5-tetrazine (0.0941 g, 6.234×$10^{-4}$ mol). The mixture was stirred until the tetrazine was completely dissolved and gas generation could be observed in the bright orange foaming paste. The orange foam continued to rise under an open air environment at 25° C. for an approximately 30 additional minutes before ceasing to grow any further. After 24 hrs, the color of the foam had changed to a light peach-yellow color and the foam was observed to fluoresce yellow under UV light. Mass of product after 24 his (0.3457 g, 99.1%) FT-IR (KBr): cm$^{-1}$=3240.05, 3074.16, 3005.07, 2920.34, 2847.63, 2151.43, 1679.44, 1511.03, 1444.27, 1380.21, 1344.89, 1308.28, 1250.63, 1215.37, 1177.11, 1077.48, 994.60, 967.45, 912.32, 829.76, 726.74, 667.31, 623.71, 489.44 Elemental Analysis: experimental: C, 72.23, H, 8.82, N, 5.65, Cl, 7.56.

Example 4

Hydroxyl Terminated Polybutadiene and 25 Mol % Dichlorotetrazine

To a 20 mL plastic weighing cup was added polybutadiene (hydroxyl functionalized, 1200 Mn) (0.2714 g, 5.026×$10^{-3}$ mol) and 3,6-dichloro-1,2,4,5-tetrazine (0.1885 g, 1.249×$10^{-3}$ mol). The mixture was stirred until the tetrazine was completely dissolved and gas generation could be observed in the bright orange foaming paste. The orange foam continued to rise under an open air environment at 25° C. for an approximately 30 additional minutes before ceasing to grow any further. After 24 hrs, the color of the foam had changed to a light peach-yellow color and the foam was observed to fluoresce yellow under UV light. Mass of product after 24 hrs (0.4083 g, 96.1%) $^{13}$C NMR (20 kHz, CPMAS): δ=170.84, 142.67, 130.56, 115.98, 42.56, 33.16, 28.34 FT-IR (KBr): cm$^{-1}$=3232.47, 3106.74, 3076.65, 3004.17, 2918.95, 2850.33, 2149.64, 1678.47, 1511.20, 1445.09, 1383.15, 1309.51, 1251.17, 1219.10, 1177.86, 1134.67, 1074.54, 994.61, 968.20, 727.76, 664.61, 621.83, 487.74 Elemental Analysis: experimental C, 65.57, H, 7.95, N, 8.73, Cl, 11.66.

Example 5

Hydroxyl Terminated Polybutadiene and 44.5 Mol % Dichlorotetrazine

To a 20 mL plastic weighing cup was added polydutadiene (hydroxyl functionalized, 1200 Mn) (0.2710 g, 5.019×10$^{-3}$ mol) and 3,6-dichloro-1,2,4,5-tetrazine (0.3371 g, 2.233×10$^{-3}$ mol). The mixture was stirred until the tetrazine was completely dissolved and gas generation could be observed in the bright orange foaming paste. The orange foam continued to rise under an open air environment at 25° C. for an approximately 30 additional minutes before ceasing to grow any further. After 24 hrs, the color of the foam had changed to a light peach-yellow color and the foam was observed to fluoresce yellow under UV light. Mass of product after 24 hrs (0.5202 g, 95.4%) FT-IR (KBr): cm$^{-1}$=3348.66, 3069.83, 3008.85, 2964.62, 2921.58, 2851.73, 2145.09, 1681.52, 1613.46, 1510.05, 1446.71, 1433.20, 1381.22, 1339.46, 1299.24, 1239.10, 1218.32, 1177.88, 1082.16, 1012.38, 996.15, 968.62, 914.14, 828.95, 757.48, 721.87, 664.01, 628.67, 563.42, 473.93 Elemental Analysis: experimental before CHCl$_3$ extraction: C, 59.31, H, 7.01, N, 11.66, Cl, 15.38 experimental after CHCl$_3$ extraction: C, 64.15, H, 7.55, N, 9.28 Cl, 11.99.

Example 6

Collapsed Foams

To a 20 mL glass scintillation vial was added polybutadiene (Aldrich 20% 1,2 addition, listed avg Mn of 5000, experimental 10023 and 21491 daltons based on polystyrene standards) (0.2698 g, 4.996 mmol) and 3,6-dichloro-1,2,4,5-tetrazine (0.1753 g, 1.161 mmol). The mixture was stirred at room temperature until the tetrazine was completely dissolved and gas generation could be observed in the bright orange foaming liquid. The orange foam continued to rise in vessel open to air. The foam continued to expand for an additional 30 minutes. After 24 hrs, the color of the foam had changed to a light peach-yellow color with a small amount of what appeared to be unreacted orange dichlorotetrazine specks contained within it and the foam was observed to fluoresce yellow under UV light. Mass of product after 24 hrs (0.4010 g, 2.291 mmol based on fully aromatized pyridazine ring). After 1 week, the foam had collapsed into an orange-brown intractable resin. $^1$H NMR (400 MHz, CDCl$_3$): δ=9.13 (s br, 0.16H, NH), 6.83 (s, 0.02H), 5.41 (d br, 1.25H, butadiene alkene/pyridazine C—H), 5.13 (s br, 0.04H, butadiene alkene H) 4.96 (m br, 0.17H, butadiene alkene 0.84-3.03 (m, 4.00H, CH$_2$) FT-IR (ATR, SiO$_2$): cm$^{-1}$=3232.73, 3089.56, 3070.27, 3006.85, 2922.54, 2850.42, 2524.51, 2152.28, 2132.54, 1896.78, 1679.30, 1581.42, 1447.00, 1381.73, 1311.26, 1239.04, 1222.71, 1164.85, 1149.42, 1070.27, 995.14, 968.26, 913.32, 697.56, 670.35, 625.20, 584.90, 526.83, 507.06, 479.35, 462.19, 435.93 Elemental Analysis: experimental: C, 65.47, H, 7.69, N, 9.62, Cl, 12.21 GPC: (PS stds, THF): Mn (Da), Mw (Da), PDI=peak 1 (25361, 27089, 1.07) peak 2 (11826, 12001, 1.015) Elemental Analysis: experimental: C, 66.76, H, 8.05, N, 8.23.

Example 7

Polybutadiene and Dichlorotetrazine

To a glass scintillation vial (20 mL volume) was added polybutadiene (cis/trans) (0.270 g, 5.00 mmol) and 3,6-dichloro-1,2,4,5-tetrazine (0.188 g, 1.25 mmol). The mixture was blended with a glass stir rod until a bright orange foaming paste was generated. The reaction was left to proceed for 24 hrs under ambient conditions. The orange foam ceased growing after 3 hrs, and became a light tan color after 24 hrs (0.432 g, 74% conversion) $^1$H NMR (400 MHz, CDCl$_3$): δ=8.98 (s, br, 0.10H), 6.71 (s, 0.07H), 5.55-5.24 (m, 1.29H), 3.54 (s, br, 0.03H), 3.08-1.07 (m, br, 4H) $^{13}$C NMR (400 MHz, CDCl$_3$): δ=140.64, 129.71, 27.53, 27.39, 27.35, 27.32, 27.22, 26.25 FT-IR (ATR, SiO$_2$): cm$^{-1}$=3208.01, 3110.29, 3006.76, 2924.68, 2856.99, 2147.76, 1680.29, 1529.98, 1452.21, 1400.53, 1310.27, 1220.05, 1173.24, 1075.71, 971.11, 912.45, 887.60, 829.38, 742.66, 673.86, 624.34, 589.20, 567.81, 551.98 GPC: (PS stds, THF): Mn (Daltons): 8184, Mw (Daltons): 36238, Mp (Daltons): 22742, PDI: 4.43 Elemental Analysis: experimental: C, 64.46, H, 8.01, N, 10.60. After 3 days the foam had collapsed into a brown intractable viscous liquid.

Example 8

Thermoplastic Foam

To a glass scintillation vial (20 mL volume) was added polybutadiene (cis/trans) (0.270 g, 5.00 mmol) and 3,6-dichloro-1,2,4,5-tetrazine (0.188 g, 1.25 mmol). The mixture was blended with a glass stir rod until a bright orange foaming paste was generated. The reaction was left to proceed for 24 hrs under ambient conditions. The orange foam ceased growing after 2 hrs, and retains its shape after formation (0.416 g). The bright orange foam collapses when exposed to methanol and is soluble in CHCl$_3$ $^1$H NMR (400 MHz, CDCl$_3$): δ=8.58 (s br, 0.11H), 5.66-5.23 (m, 1.21H), 5.20-4.60 (m, 2.00H), 3.26-0.76 (m, 4.70H) $^{13}$C NMR (20 kHz, CPMAS): δ=170.18, 156.41, 143.39, 129.94, 115.96, 39.64 FT-IR (ATR, SiO$_2$): cm$^{-1}$=3241.40, 3077.06, 2972.69, 2918.68, 2846.12, 1892.40, 1833.52, 1681.89, 1636.30, 1559.77, 1451.84, 1418.18, 1377.27, 1311.78, 1237.29, 1136.70, 1076.97, 995.59, 909.64, 829.76, 756.39, 668.09, 626.67, 610.87, 571.01, 547.18, 488.32, 473.59 GPC: (PS stds, THF): Mn (Daltons): 4200, Mw (Daltons): 5984, Mp (Daltons): 5355, PDI: 1.42.

Example 9

Linear Polymers

A 50 mL 14/20 1-neck round-bottom flask was equipped with a Teflon coated magnetic stir bar and polybutadiene predominately 1,2-addition, measured Mw 4414 dalton, (0.216 g, 0.004 mol), and 3,6-dichloro-1,2,4,5-tetrazine (0.604 g, 0.004 mol), and dichloromethane (20 mL) were added to the flask creating a transparent bright orange solution. The solution was degassed with argon for 30 minutes and then refluxed for 72 hrs during which time the solution developed a slight dark brown color but remained transparent. The solution was cooled to room temperature (23° C.) and brown residue was observed to have formed on the sidewalls of the flask. A solution of freshly prepared dimethyl dioxirane in acetone (4 mL) was added to the flask, and the reaction was stirred for 1 hr. During this time the solution became more transparent. The reaction solution was concentrated under reduced pressure before precipitating into hexanes. The precipitate was collected and dried with vacuum filtration, then dried further by heating to 50° C. under dynamic vacuum to yield a white powder (0.448 g) $^1$H NMR (400 MHz, DMSO d$_6$): δ=10.88 (s br, 0.06H), 10.47 (s br, 0.05H), 9.93-9.26 (m br, 0.10H), 8.04 (s br, 0.73H), 5.31 (s br, 1.11H), 4.86 (s br, 1.90H), 3.62-0.78 (m br, 8.35H) $^{13}$C NMR (20 kHz, CPMAS): δ=157.88, 141.75, 129.73, 94.65, 68.27, 27.58, 17.40 FT-IR (ATR, SiO$_2$): cm$^{-1}$=3073.97, 2921.94, 2852.00, 1696.40, 1639.36, 1560.34, 1452.14, 1419.40, 1380.09, 1325.55, 1135.93, 1079.97, 1050.53, 997.87, 915.64, 856.53, 832.86, 797.41, 760.26, 721.15, 693.46, 626.05, 613.73, 592.08, 573.38, 545.57, 493.15, 470.64, 449.19, 439.16, 418.74 Elemental Analysis: experimental: C, 50.72, H, 4.93, N, 13.88 GPC: (PS stds, THF): Mn (Daltons): 4616. Mw (Daltons): 5930, Mp (Daltons): 5276, PDI: 1.28.

Example 10

Linear Polymers

-continued

A 50 mL 14/20 1-neck round-bottom flask was equipped with a Teflon coated magnetic stir bar and polybutadiene predominately cis/trans, measured Mw 22209 dalton, (0.216 g, 0.004 mol), and 3,6-dichloro-1,2,4,5-tetrazine (0.604 g, 0.004 mol), and dichloromethane (20 mL) were added to the flask creating a transparent bright orange solution. The solution was degassed with argon for 30 minutes and then refluxed for 72 hrs during which time the solution became an opaque dark brown color. The solution was cooled to room temperature (23° C.) and a solution of freshly prepared dimethyl dioxirane in acetone (4 mL) was added to the flask and stirred for 1 hr. During this time the solution became slightly more transparent. The reaction solution was concentrated on the rotovap, dissolved in THF (2 mL) and precipitated into methanol (20 mL). The precipitate was collected and dried with vacuum filtration, then dried further by heating to 50° C. under high vac to yield a brown solid (0.301 g). $^{13}$C NMR (20 kHz, CPMAS): δ=157.68, 141.75, 129.73, 68.27, 27.58, 17.40 FT-IR (ATR, SiO$_2$): cm$^{-1}$=3246.77, 3008.51, 2944.11, 2865.69, 1636.62, 1527.08, 1446.61, 1396.23, 1310.51, 1150.59, 1075.29 1019.47, 916.79, 797.36, 738.83, 585.35 Elemental Analysis: experimental: C, 52.86, H, 5.59, N, 13.11 GPC: (PS stds, THF): bimodal (peak 1) Mn (Daltons): 9975; Mw (Daltons): 17432; Mp (Daltons): 14661; PDI: 1.75 (peak 2) Mn (Daltons): 1748; Mw (Daltons): 1788; Mp (Daltons): 1818; PDI: 1.02. A white precipitate was observed to have passed through the filter, it was concentrated under vacuum, dissolved in THF (1 mL), and precipitated into hexanes (10 mL) to yield an off white powder (0.106 g,) $^{13}$C NMR (20 kHz, CPMAS): δ=157.70, 152.16, 141.78, 129.78, 104.31, 57.24, 44.34, 28.15, 16.97 FT-IR (ATR, SiO$_2$): cm$^{-1}$=3230.43, 3010.25, 2945.96, 2854.92, 1650.59, 1636.31, 1525.96, 1446.65, 1396.15, 1310.75, 1151.19, 1081.31, 1016.03, 971.05, 735.03, 589.08, 552.10 Elemental Analysis: experimental: C, 52.50, H, 5.30, N, 13.10 GPC: (PS stds, THF): bimodal (peak 1) Mn (Daltons): 10085, Mw (Daltons): 16426, Mp (Daltons): 14142, PDI: 1.63 (peak 2) Mn (Daltons): 1720, Mw (Daltons): 1765, Mp (Daltons): 1835, PDI: 1.03.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures.

In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A method of making a solid composition, the method comprising reacting a tetrazine component with a polymer component comprising a polybutadiene component, wherein the tetrazine component comprises:

wherein R$_1$=alkyl, aryl, halide, ether, amine, thiol ether, ketone, amide, pyridyl, ester, guanidinyl or hydrazinyl;
wherein R$_2$=alkyl, aryl, halide, ether, amine, thiol ether, ketone, amide, pyridyl, ester, guanidinyl or hydrazinyl; and
wherein the polybutadiene component comprises a cyclic polydiene.

2. The method of claim 1, wherein the cyclic polydiene component comprises a polycyclohexadiene.

3. A method of making a solid composition, the method comprising reacting a tetrazine component with a polymer component comprising a polybutadiene component, wherein the tetrazine component comprises:

wherein R$_1$=alkyl, aryl, halide, ether, amine, thiol ether, ketone, amide, pyridyl, ester, guanidinyl or hydrazinyl;
wherein R$_2$=alkyl, aryl, halide, ether, amine, thiol ether, ketone, amide, pyridyl, ester, guanidinyl or hydrazinyl; and
wherein the polybutadiene component comprises a halogenated polybutadiene, an arylated polybutadiene, or an alkylated polybutadiene.

4. The method of claim 3, wherein the halogenated polybutadiene component comprises a polychloroprene.

5. The method of claim 3, wherein the arylated polybutadiene component comprises a poly-2-phenylbutadiene.

6. The method of claim 3, wherein the alkylated polybutadiene component comprises a poly-isoprene.

7. A method of making a solid composition, the method comprising reacting a tetrazine component with a polymer component comprising a polybutadiene component, wherein the tetrazine component comprises:

wherein R$_1$=alkyl, aryl, halide, ether, amine, thiol ether, ketone, amide, pyridyl, ester, guanidinyl or hydrazinyl;

wherein $R_2$=alkyl, aryl, halide, ether, amine, thiol ether, ketone, amide, pyridyl, ester, guanidinyl or hydrazinyl;

wherein the polybutadiene component comprises a copolymer polybutadiene component;

wherein the copolymer polybutadiene component comprises a block copolymer polybutadiene, a diene monomer unit in random copolymer polybutadiene component, or a graft polymer polybutadiene; and wherein the block copolymer polybutadiene component comprises a poly(butadiene-block-styrene).

8. A method of making a solid composition, the method comprising reacting a tetrazine component with a polymer component comprising a polybutadiene component, wherein the tetrazine component comprises:

wherein $R_1$=alkyl, aryl, halide, ether, amine, thiol ether, ketone, amide, pyridyl, ester, guanidinyl or hydrazinyl;

wherein $R_2$=alkyl, aryl, halide, ether, amine, thiol ether, ketone, amide, pyridyl, ester, guanidinyl or hydrazinyl;

wherein the polybutadiene component comprises a copolymer polybutadiene component;

wherein the copolymer polybutadiene component comprises a block copolymer polybutadiene, a diene monomer unit in random copolymer polybutadiene component, or a graft polymer polybutadiene; and wherein the diene monomer units in random copolymer comprises a poly(butadiene-co-acrylonitrile).

9. A method of making a solid composition, the method comprising reacting a tetrazine component with a polymer component comprising a polybutadiene component, wherein the tetrazine component comprises:

wherein $R_1$=alkyl, aryl, halide, ether, amine, thiol ether, ketone, amide, pyridyl, ester, guanidinyl or hydrazinyl;

wherein $R_2$=alkyl, aryl, halide, ether, amine, thiol ether, ketone, amide, pyridyl, ester, guanidinyl or hydrazinyl;

wherein the polybutadiene component comprises a copolymer polybutadiene component;

wherein the copolymer polybutadiene component comprises a block copolymer polybutadiene, a diene monomer unit in random copolymer polybutadiene component, or a graft polymer polybutadiene; and wherein the graft polymer polybutadiene component comprises poly(acrylonitrile-butadiene-styrene).

10. A method of making a solid composition, the method comprising reacting a tetrazine component with a polymer component comprising a polybutadiene component, wherein the tetrazine component comprises:

wherein $R_1$=alkyl, aryl, halide, ether, amine, thiol ether, ketone, amide, pyridyl, ester, guanidinyl or hydrazinyl;

wherein $R_2$=alkyl, aryl, halide, ether, amine, thiol ether, ketone, amide, pyridyl, ester, guanidinyl or hydrazinyl;

wherein the polybutadiene component comprises a copolymer polybutadiene component; and wherein the copolymer polybutadiene component has the structure:

wherein $R^9$=hydrogen, alkyl, aryl or halide; $R^{10}$=aryl, nitrile, halide or ester; d, e=the number of repeat units in a block or relative number of units in a random copolymer, wherein each letter can be independently same or different with certain numerical values of 1-25,000, 500-25,000, 1000-25,000, 2000-25,000, or 5000-25,000.

* * * * *